UNITED STATES PATENT OFFICE.

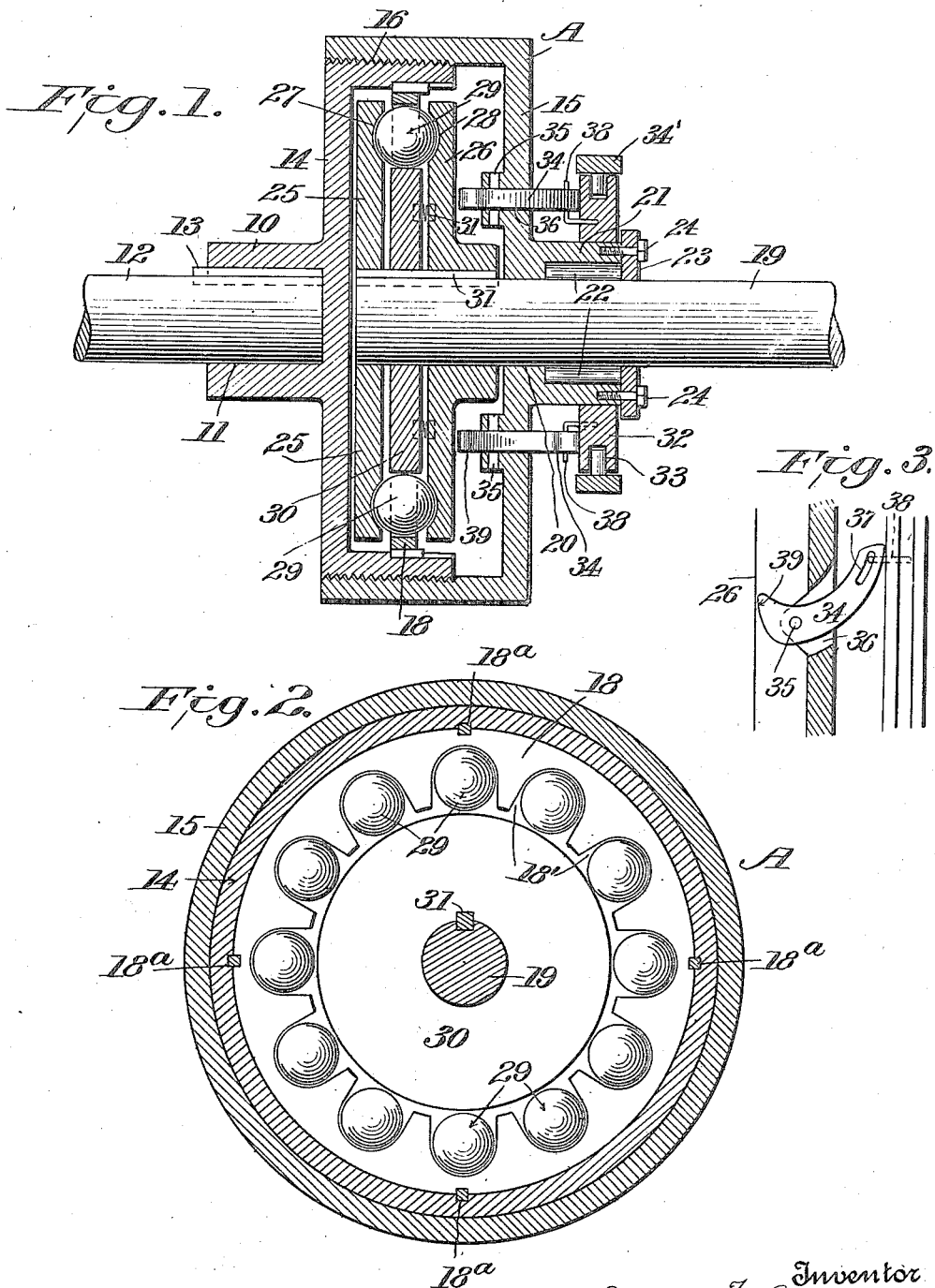

BENJAMIN F. AUGUSTINE, OF BUFFALO, NEW YORK.

CLUTCH.

1,210,257.

Specification of Letters Patent.

Patented Dec. 26, 1916.

Application filed July 2, 1915. Serial No. 37,744.

*To all whom it may concern:*

Be it known that I, BENJAMIN F. AUGUSTINE, a citizen of the United States, residing at Buffalo, in the county of Erie and State of New York, have invented certain new and useful Improvements in Clutches, of which the following is a specification.

This invention relates to clutches.

One object is to provide a clutch embodying among other characteristics, a driving shaft, a driven means operatively connected to the driving shaft and including a ball spacer for the support of balls adapted to be gripped tightly against the spacer to operatively connect the driving shaft and driven means together.

Another object resides in the provision of a clutch which may be easily and readily installed or dismounted.

A still further object resides in the provision of a clutch embodying a driving means and a driven means therefor including balls arranged for independent movement upon disconnection of the driving and driven means and which are held against rotation in the clutching action to effect a positive driving of the driven means.

It is still further designed to provide a clutch embodying among other characteristics a driven and a driving means wherein the driving means includes balls movable between disks when the driven and driving means are uncoupled and which are held tightly between the disks through their centers or on lines parallel with the driving and driven shafts when the driving and driven means are operatively coupled together.

With the above and other objects in view, the present invention consists in the combination and arrangement of parts hereinafter more fully described, illustrated in the accompanying drawings and particularly pointed out in the appended claims, it being understood that changes may be made in the form, proportion, size and minor details without departing from the spirit or sacrificing any of the advantages of the invention.

In the drawings: Figure 1 is a vertical sectional view taken along the line of the shafts. Fig. 2 is a transverse sectional view. Fig. 3 is a fragmentary perspective view of a portion of the device for operating the driving means.

Referring now more particularly to the accompanying drawings, the driven means of my improved clutch, as illustrated in the accompanying drawings, may consist of a casing A provided on one side with a hub 10 having socket 11 in which the inner end of the driven shaft 12 is secured by means of a suitable key 13. The casing A is preferably composed of two cup shaped sections 14 and 15, the annular flange of the section 14 being preferably of smaller diameter than the annular flange of the section 15 and having screw threaded connection 16 therewith so that the sides of the casing may be adjusted, if desired, for purposes hereinafter explained. Carried by the casing A is a ball spacer 18 located within the casing and preferably rigidly but adjustably secured within and carried by the section 14 of the casing through the instrumentality of suitable keys 18ª. This ball spacer is preferably of annular or ring form provided on its inner edge with a plurality of notches 18'. It is the rotative movement given the ball spacer 17 which drives the driven means including the spacer 17, the casing A and the shaft 12 hereinafter described.

The driving means, as illustrated, may consist of a driving shaft 19 having one end extending into the casing A in alinement with the driven shaft 12, through an opening 20 and a hub 21 formed on the casing A, there being roller bearings 22 interposed between the hub 21 and the driving shaft 19 and held against outward displacement by a collar 23 secured to the outer end of the hub by means of suitable fastenings 24.

Ball clutching collars 25 and 26 are located in the casing A on opposite sides of the ball spacer 18, the disk 25 being fixed to the shaft 19 and the disk 26 being slidable longitudinally of the driving shaft 19. The opposing faces of the disks 25 and 26 have continuous annular grooves 27 and 28, respectively, adapted to lie opposite a plurality of balls 29 located in the notches 18' of the spacer 18. The balls may be held in the notches in this relation to the continuous grooves 27 and 28 of the disks 25 and 26, respectively, by means of a collar 30 fixedly secured on the shaft 19 between the disks and coincident with the spacer 18.

While one key 31 is shown as securing the disks 25 and 26 and the collar 30 against rotation on the shaft 19, the key or the connections between the disk 25 and the collar 30 and the key or the shaft may be manipulated so as to hold the disk 25 and the collar 30 against longitudinal movement of the shaft 19. It is preferable, however, in the event of an adjustment of the spacer 18 on the section 14 of the casing A that the connections between the disk 25 and the shaft 19 be such that corresponding adjustment of these two elements may also be permitted. In any event, the slidable disk 26 is held normally in its outermost position with relation to its companion disk 25 through the instrumentality of springs or other yieldable elements 31 interposed between the collar 30 and the disk 26. When the disk 26 is thrown by said springs 31 to its outermost position the balls 29 lie loosely in the opposing continuous grooves 27 and 28 of the clutching disks 25 and 26, respectively, and may have free rolling contact with the peripheral edge of the collar 30, whereby the driving means may rotate freely without driving the driven means. When the disk 26 is thrown toward the disk 25 the continuous annular grooves 27 and 28 of the respective disks take the balls 29 and grip them firmly through their centers, that is, on lines parallel to the shafts 12 and 19, holding the balls tightly in the grooves against rotation. The rotative movement of the driving shaft 19 and consequent rotation of the disk 26 as it moves toward the disk 25 causes the balls to bear in the grooves of the disks against the side edge of the corresponding notches 18' of the spacer and, by reason of the spacer having rigid connection with the casing and by virtue of the driven shaft 12 being fixedly secured to the casing, the driven means of the clutch is driven by reason of the balls being engaged with the sides of the notches of the spacer and held against rotative movement therein as should be now well understood.

Various forms of means may be employed for throwing the driving means into coöperative relation with the driven means, that is to say, to throw the disk 26 into coöperative relation with the disk 25 against the outward thrust of the aforesaid springs or the like 31. For purposes of illustration, I have shown one means to accomplish this result. For instance, a collar 32 is slidably mounted upon the hub 21 of the section 15 of the casing A and provided with a groove 33 to receive any suitable form of shifting means 34' which may be locked, when desired. Curved arms are mounted on suitable pivots 35 located within the casing A. These curved arms project through slots 36 formed in the section 15 of the casing. The outer ends of the arms are preferably slotted as at 37 and mounted on suitable pivots 38 secured to the collar 32. Inward movement of the collar 32 will cause the curved arms 36 to swing on their pivots 35 and bring their inner ends 39 into engagement with the outer face of the disk 26 and by the continued inward movement of the collar 32 cause a thrust on the slidable disk 26 toward the fixed opposing disk 25 and effect a tight binding fixed engagement of the balls 29 between the disks 25 and 26 and result in a consequent operative driving connection between the driving and driven means of the clutch. By virtue of the screw threaded connection 16 of the casing the same may be adjusted within certain limits to various sizes to accommodate varying distances between the inner ends of the driving and driven shafts.

As the result of the particular form of clutch herein described, a coupling and uncoupling of the clutch is easily, quickly and positively effected and a free and easy rotation of the driving shaft permitted, whether the shafts be coupled or uncoupled. The clutch is applicable to clutching shafts in laundries, machine shops, or for other installations and is easily and quickly installed wherever desired.

What is claimed is:—

1. A clutch comprising a driven shaft, a casing to which said shaft is rigidly secured, a driving shaft having one end projecting into said casing, and by the casing spaced from the driven shaft, a ball spacer connected to the casing and located therein, balls supported loosely in the spacer, and means slidable on the driving shaft and arranged within the casing to grip the balls and thereby connect the driving and driven shafts operatively together.

2. A clutch comprising a driven means including a ball spacer, driving means, balls supported loosely in the spacer and means carried by the driving means to grip the balls tightly and cause them to rotate the spacer and thereby drive the driven means.

3. A clutch, comprising a driven means including a ball spacer and balls mounted in the spacer, a drive shaft, and means movable longitudinally on the drive shaft and operable to hold the balls against rotation to effect an operative connection between the drive shaft and the driven means.

4. A clutch comprising a driven means including a casing, a ball spacer rigidly secured thereto, and a shaft fixedly secured to the casing; and means for rotating said driving means including a driving shaft projecting at one end into the casing, balls supported on the spacer, and means within the casing and operable longitudinally on the driving shaft to grip the balls tightly to effect positive operative connection between the driving and driven means.

5. A clutch comprising a driving shaft, a driven means including a casing, a ball spacer, balls loosely supported in the spacer, and means arranged within the casing and operable longitudinally of the shaft to grip the balls tightly through their centers to hold the same in engagement with the spacer and thereby effect an operative connection between the driving and driven means.

6. A clutch, comprising a driving means, a driven means including a ball spacer provided with notches, balls loosely supported in the notches of the spacer, and disks movable longitudinally of the driven means into gripping relation with the balls to hold the same tightly in engagement with the side of the notches of the spacer to effect an operative connection between the driving and driven means.

7. A clutch comprising a casing composed of sections having screw threaded connection with each other, one section having a socket, a driven shaft keyed in said socket, the other section having a central aperture and a hub and also provided with slots, a driving shaft extending into the casing through said hub and said aperture, a disk located in the casing and fixedly secured on the inner end of the driving shaft, a second disk for coöperation with the first named disk located within the casing and slidable on the driving shaft, said disks having continuous annular grooves in their opposing faces, a ball spacer adjustably connected to one of the casing sections and located between said disks, balls supported in the spacer, means for forcing the slidable disk normally away from the fixed disk, and means including elements projecting through the slots of said casing for shifting the slidable disk toward the fixed disk against the tension of the last named means to effect gripping of the balls tightly in the grooves of the disks and thereby hold the balls against rotation in the spacer and effect an operative connection between the driving and driven shafts.

8. A clutch comprising a casing composed of sections having screw threaded connection with each other, one section having a socket, a driven shaft keyed in said socket, the other section having a central aperture and a hub and also provided with slots, a driving shaft extending into the casing through said hub and said aperture, a disk located in the casing and fixedly secured on the inner end of the driving shaft, a second disk for coöperation with the first named disk located within the casing and slidable on the driving shaft, said disks having continuous annular grooves in their opposing faces, a ball spacer adjustably connected to one of the casing sections and located between said disks, balls supported in the spacer, means for forcing the slidable disk normally away from the fixed disk, a collar slidably mounted on the hub of the casing, arms pivoted within the casing and projecting through the aforesaid slots of the casing and at their outer ends having pivotal connection with said collar whereby upon inward movement of said collar the arms are swung on their pivots into engagement with the slidable disk to force the latter toward the fixed disk to grip the balls tightly in said opposing grooves of the disks to hold them against rotation and thereby effect an operative connection between the driving and driven shafts.

9. A clutch comprising a driven shaft, a casing to which said shaft is secured, a driving shaft having one end projecting into said casing, a ball spacer connected to the casing and located therein, balls supported loosely in the spacer, and means fixed to the driving shaft and within the casing and operable longitudinally of the driving shaft to hold the balls against rotation in the spacer for coaction with the latter to effect an operative driving connection between the driving and driven shafts.

10. A clutch comprising a driven shaft, a driving shaft, connections between said shafts including a rigidly mounted ball spacer, balls mounted in said spacer and normally loose therein to permit rotation of the driving shaft without rotation of the driven shaft, and means arranged within the casing and operable longitudinally of the driving shaft to grip the balls in the spacer for coaction therewith to effect an operative driving connection between the driving and driven shafts.

11. A clutch, comprising a casing composed of detachable sections, one of the sections having a socket and the other having a hub provided with a bearing disposed in alinement with said socket, a driven shaft keyed in said socket, a driving shaft mounted in said bearing and projecting into the casing, a disk keyed on the inner end of the driving shaft, a disk slidable on the driving shaft, both of said disks being confined within the casing, a ball spacer keyed to the casing and located in the casing between said disks, balls mounted in said spacer, and means for sliding said slidable disk to grip the balls in the spacer between said disks and thereby effect an operative driving connection between the driving and driven shafts.

12. A clutch, comprising a casing, a driven shaft connected to the casing exteriorly thereof, a driving shaft projected into the casing, the adjacent ends of the shafts being spaced by said casing, means within the casing and having connection therewith and with the driving shaft to effect an operative driving connection between the shafts through said casing, and means projecting into the casing to effect the aforesaid means to provide for said operative driving connection.

In testimony whereof I affix my signature.

BENJAMIN F. AUGUSTINE.